United States Patent
Borden et al.

(10) Patent No.: US 11,913,188 B2
(45) Date of Patent: Feb. 27, 2024

(54) AUTOMATED TOOL ACCESS TO A MANHOLE THROUGH AUTOMATED MANHOLE COVER REMOVAL USING SELF-DRIVING VEHICLE

(71) Applicant: R.H. BORDEN AND COMPANY, LLC, South Jordan, UT (US)

(72) Inventors: Jonathan R. Borden, Holladay, UT (US); Eric Russell Petersen, Holladay, UT (US)

(73) Assignee: R.H. BORDEN AND COMPANY, LLC, South Jordan, UT (US)

( * ) Notice: Subject to any disclaimer, the term of this patent is extended or adjusted under 35 U.S.C. 154(b) by 508 days.

(21) Appl. No.: 17/174,061

(22) Filed: Feb. 11, 2021

(65) Prior Publication Data

US 2022/0251797 A1    Aug. 11, 2022

(51) Int. Cl.
*E02D 29/14* (2006.01)
*B60W 60/00* (2020.01)
*G01C 21/26* (2006.01)

(52) U.S. Cl.
CPC ....... *E02D 29/1445* (2013.01); *B60W 60/001* (2020.02); *G01C 21/26* (2013.01); *B60W 2300/17* (2013.01); *B60W 2554/80* (2020.02)

(58) Field of Classification Search
CPC ........... E02D 29/1445; B60W 60/001; B60W 2300/17; B60W 2554/80; G01C 21/26
USPC ..................... 404/25, 72, 75, 83, 84.05–84.5
See application file for complete search history.

(56) References Cited

U.S. PATENT DOCUMENTS

| | | | | |
|---|---|---|---|---|
| 7,201,532 | B2 * | 4/2007 | Konno | E02D 29/1409 404/26 |
| 10,916,129 | B2 * | 2/2021 | Castelli | H04W 76/10 |
| 2007/0269267 | A1 * | 11/2007 | Roberts | B66F 19/005 404/73 |
| 2009/0279993 | A1 * | 11/2009 | Roberts | B66F 19/005 414/592 |
| 2016/0060820 | A1 * | 3/2016 | Berning | E01C 19/264 404/84.2 |
| 2016/0060825 | A1 * | 3/2016 | Fritz | E01C 23/01 701/32.4 |

(Continued)

FOREIGN PATENT DOCUMENTS

| | | |
|---|---|---|
| CN | 105839569 | 8/2016 |
| CN | 111422749 | 7/2020 |

(Continued)

OTHER PUBLICATIONS https://www.rockmillsent.com/the-lifter/).

(Continued)

*Primary Examiner* — Raymond W Addie
(74) *Attorney, Agent, or Firm* — WORKMAN NYDEGGER

(57) ABSTRACT

The use of a self-driving vehicle to automatically find manholes, and for each remove the manhole cover from the manhole, and thereafter put the manhole cover back in position on the manhole. In some embodiments, while the manhole cover is removed, the self-driving vehicle is used to automatically place a tool above or within the manhole. Accordingly, a self-driving vehicle can automatically inspect, repair, or maintain manholes that are positioned in roadways. The data can then automatically be gathered without human intervention.

11 Claims, 9 Drawing Sheets

(56) References Cited

U.S. PATENT DOCUMENTS

| | | | |
|---|---|---|---|
| 2016/0177540 A1 | 6/2016 | Penza et al. | |
| 2019/0061756 A1* | 2/2019 | Adam | B60W 30/0953 |
| 2021/0309248 A1* | 10/2021 | Choe | B60W 50/06 |
| 2023/0211787 A1* | 7/2023 | Hanson | G08G 1/166 |
| | | | 701/117 |

FOREIGN PATENT DOCUMENTS

| | | |
|---|---|---|
| DE | 202017100684 | 4/2017 |
| WO | 201907335 | 4/2019 |

OTHER PUBLICATIONS https://www.magnetics.com/product.asp?ProductID=115.
PCT/US22/14351, Notification of Transmittal of the International Search Report and the Written Opinion of the International Searching Authority, or Declaration dated Jun. 6, 2022 (12 pages).

* cited by examiner

AUTOMATED TOOL ACCESS TO A MANHOLE THROUGH AUTOMATED MANHOLE COVER REMOVAL USING SELF-DRIVING VEHICLE

BACKGROUND

Manholes are often used as an access point for an underground utility, allowing inspection, maintenance, and upgrades. Many underground services have manholes, including water, sewers, telephone, electricity, storm drains, and gas. Often, manholes are located along roads, especially in urban and suburban settings. To prevent unsafe conditions and exposure of the underground utility to the elements, manhole closings are typically covered with a heavy manhole cover. Manholes are also referred to less often as a utility hole, maintenance hole, sewer hole, or access hatch. The etymology of the term "manholes" is thought to be a composite of the terms "man" (historically used in the sense of the broader term "human) and "hole", because the manhole is a hole that allows a human to enter and access the underground utility.

In order to inspect or maintain an underground utility, a utility worker will typically travel to the manhole, remove the manhole cover, and either enter the manhole or lower equipment into the manhole. The conditions of the manhole and underground utility system proximate the manhole can thus be inspected and appropriate repairs made to keep the underground utility operating, and thereby extend the life of the underground utility system.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The principles described herein relate to the use of a self-driving vehicle to automatically find manholes, remove manhole covers from the manhole, and thereafter put the manhole cover back in position on the manhole. In some embodiments, while the manhole cover is removed, the self-driving vehicle is used to automatically place a tool above or within the manhole. Accordingly, a self-driving vehicle can automatically inspect, repair, or maintain manholes that are positioned in roadways. The data can then automatically be gathered without human intervention.

In accordance with one aspect of the principles described herein, the self-driving vehicle drives over a road to the manhole on the road so as to position the self-driving vehicle in a position with respect to the manhole. While the self-driving vehicle is in the position with respect to the manhole, the self-driving vehicle automatically removes the manhole cover of the manhole using a mechanism attached to the self-driving vehicle. After potentially using a tool at that manhole, the self-driving vehicle automatically puts back the manhole cover on the manhole also using a mechanism attached to the self-driving vehicle (perhaps the same mechanism as was used to remove the manhole cover).

In accordance with another aspects of the principles described herein, the self-driving vehicle is configured to remove and put back manhole covers by attaching a manhole cover handling mechanism to the self-driving vehicle so that the self-driving vehicle is configured to selectively actuate the manhole handling mechanism when the self-driving vehicle is in a position with respect to a manhole. When the manhole handling mechanism is actuated, the manhole handling mechanism extends towards, contacts, and attaches to a manhole cover of the manhole, and thereafter removes the attached manhole cover from the manhole.

In accordance with another aspect of the principles described herein, there is a self-driving vehicle that is configured to find and remove manhole covers, the self-driving vehicle includes a manhole navigation mechanism configured to find a manhole on the road, and position the self-driving vehicle at a position with respect to the manhole. The self-driving vehicle also includes a manhole handling mechanism attached to the self-driving vehicle. The manhole cover handling mechanism includes a manhole cover attachment mechanism configured to attach to the manhole cover; and a movement mechanism configured to respond to commands to move the manhole cover attachment mechanism with respect to the self-driving vehicle. The self-driving vehicle also includes a command module configured to issue commands to the movement mechanism to cause the movement mechanism to force the manhole cover attachment mechanism to attach to a manhole cover that the manhole navigation mechanism has caused the self-driving vehicle to drive close to, to lift the manhole cover from off the manhole, to move the manhole cover laterally out from directly above the manhole, and to put back the manhole cover on the manhole.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

The principles described herein relate to the use of a self-driving vehicle to automatically find manholes, and for each remove the manhole cover from the manhole, and thereafter put the manhole cover back in position on the manhole. In some embodiments, while the manhole cover is removed, the self-driving vehicle is used to automatically place a tool above or within the manhole. Accordingly, a self-driving vehicle can automatically inspect, repair, or maintain manholes that are positioned in roadways. The data can then automatically be gathered without human intervention.

Figure 1:
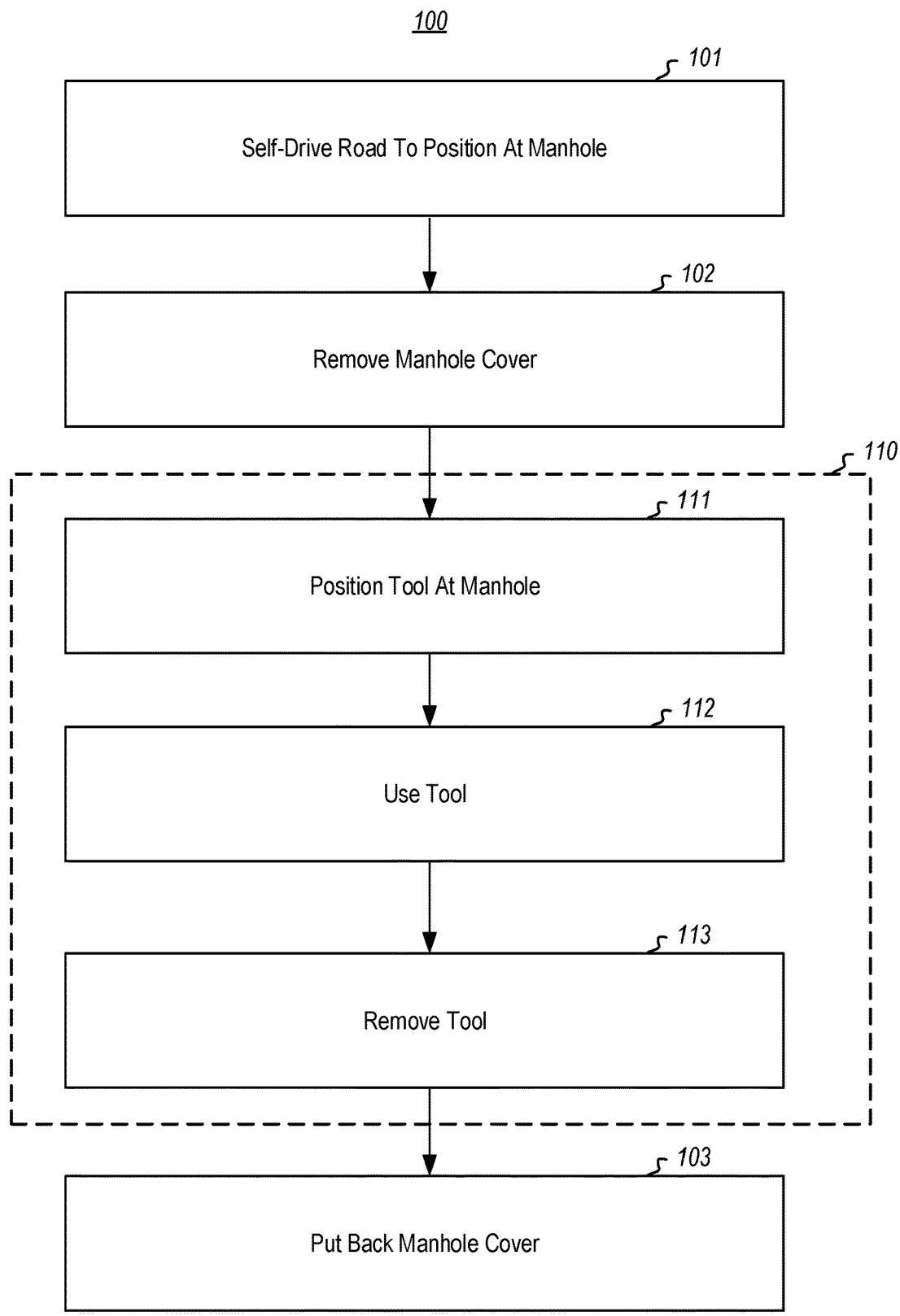
FIG. 1 illustrates a flowchart of a method performed by a self-driving vehicle for finding, removing, and putting back of a manhole cover of a manhole.

FIG. 1 illustrates a flowchart of a method 100 performed by a self-driving vehicle for finding, removing, and putting back a manhole cover of a manhole. The method 100 may be performed repeatedly for multiple and perhaps many manholes. As an example, the self-driving vehicle may drive through the roads of an entire region to remove and put back all or substantially all of the manhole covers of manholes within that region. In this description, a "road" refers to any surface that can be driven on. As an example, a road may be a highway, street, alley, boulevard, lane, roadway, thoroughfare, and so forth. There is no requirement that the road even be paved so long as the self-driving vehicle can drive on the road. Thus, a dirt road falls within the definition of "road" herein.

The method 100 includes an act of self-driving over a road to the manhole on the road so as to position the self-driving vehicle in a position with respect to the manhole (act 101). While the self-driving vehicle is in the position with respect to the manhole, the self-driving vehicle performs an act of automatically removing the cover of the manhole using a mechanism attached to the self-driving vehicle (act 102). Optionally, the acts within the dashed box 110 may then be performed. Specifically, the self-driving vehicle performs an act of positioning a tool above or within the manhole using a tool placement mechanism attached to the self-driving vehicle (act 111). In that case, the self-driving vehicle thereafter performs an act of using the tool (act 112), and then an act of removing the tool from above or from within the manhole using the tool placement mechanism (act 113). Regardless of whether the tool is put in place and removed, the self-driving vehicle then performs an act of automatically putting back the manhole cover on the manhole using a mechanism attached to the self-driving vehicle (act 103).

As an example, suppose that the tool is a diagnostics tool such as an imaging tool. In that case, the act of using the tool (act 112) could be an act of using the tool to inspect the manhole or content of the manhole. As an example, the tool might image the manhole and/or its contents. In this case, the self-driving vehicle may repeatedly perform the method 100 to thereby acquire images of many manholes within a geographic area, all without manual intervention from any human being. Those images may then be used to formulate a maintenance plan for the manholes to optimize performance and longevity of the corresponding underground utility system.

As another example, suppose that the tool applies some kind of physical force to the manhole or its contents. For instance, the tool might be a cleaning tool that perhaps sprays and/or scrubs the interior of the manhole. In that case, the act of using the tool (act 112) could include an act of using the tool to apply physical force to the manhole or contents of the manhole. Thus, the self-driving vehicle may repeatedly perform the method 100 to thereby mechanically treat (e.g., clean) manholes within a geographic area, all without manual intervention from any human being.

In one embodiment, the tools may be interchanged. Thus, in an inspection phase, a self-driving vehicle may first repeatedly perform the method 100 to first inspect the manholes within a given region, allowing for a maintenance plan to be formulated. Later, in a maintenance phase, a self-driving vehicle may then repeatedly perform the method 100 to perform maintenance on manholes in accordance with the maintenance plan formulated from the previous inspection. Thus, in the maintenance phase, the self-driving vehicle may perform maintenance on a subset of the manholes inspected in the inspection phase. Although not required, the same self-driving vehicle may perform both the inspection phase and the maintenance phase, by changing out the tool between phases.

Each of the acts of FIG. 1 will now be described in further detail. As previously mentioned, for each of multiple manholes, the self-driving vehicle finds a manhole on the road upon which the self-driving vehicle is driving and positions itself with respect to the manhole (act 101). In one embodiment, the self-driving vehicle may be equipped with a navigation system with a location of at least some manholes already set, which can help the self-driving vehicle get within proximity of the manhole and slow down as the self-driving vehicle approaches a manhole. As an example, the navigation system may be a Global Positioning System (GPS) system. In such case, the location of manholes may be represented within a Geographic Information System (GIS) system using GPS coordinates. Some cities already have locations of manholes recorded within their GIS system. Thus, the self-driving vehicle may be configured to load the GIS system from whichever territory it is about canvas. For each manhole, once the self-driving vehicle self-drives close to the manhole, the self-driving vehicle can use computer vision to recognize an approaching manhole. The self-driving vehicle uses its steering to position itself in a predetermined position with respect to the manhole.

Figure 2:
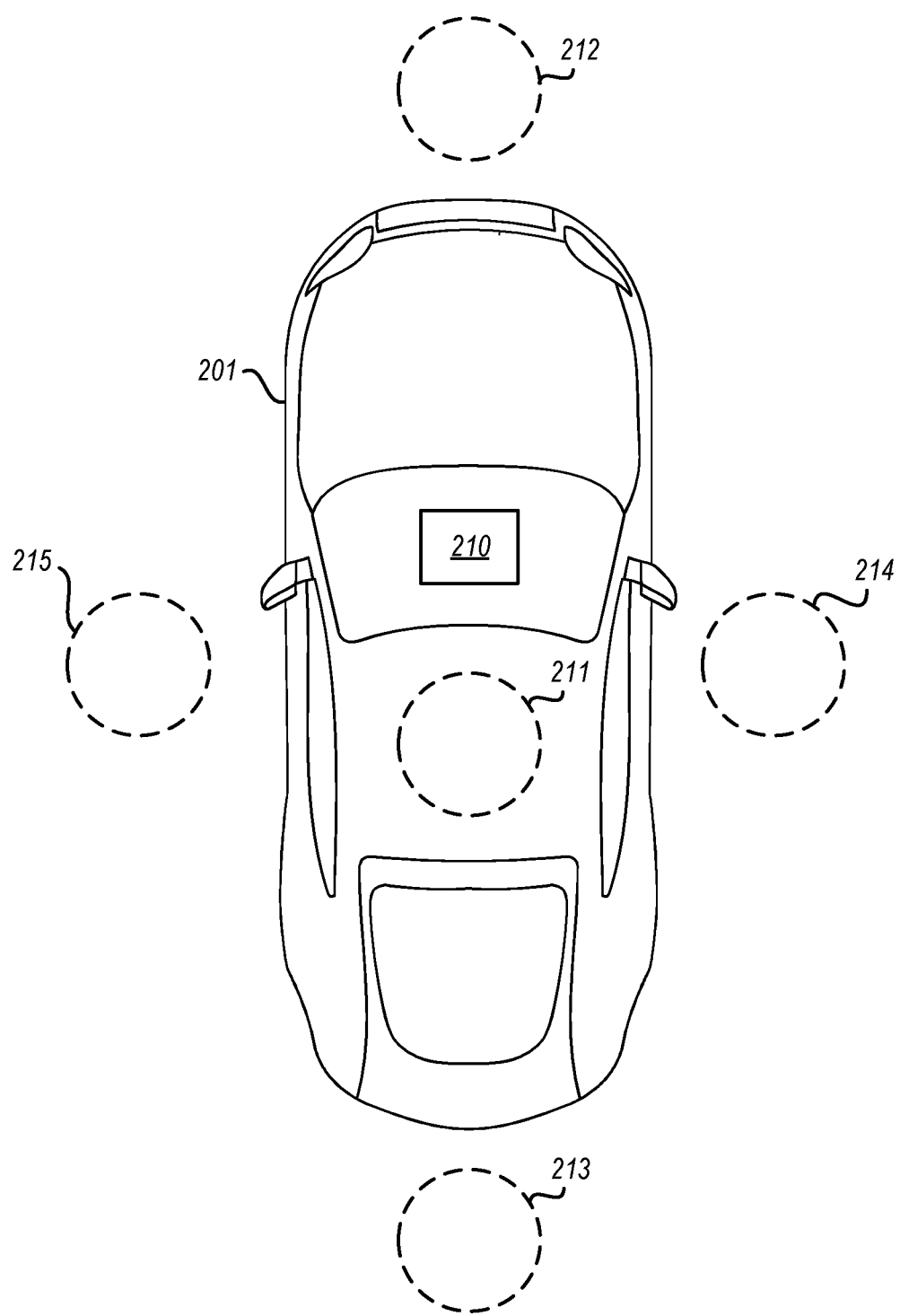
FIG. 2 illustrates a top view of a self-driving vehicle in conjunction with several possible predetermined positions of a manhole (represented as a circle with dashed-lined borders)

FIG. 2 illustrates a top view of a self-driving vehicle 201 in conjunction with several possible predetermined positions of a manhole (represented as circles with dashed-lined borders). As an example, the predetermined position might be directly above the manhole as represented by manhole position 211. Alternatively, the predetermined position might be right behind the manhole position as represented by manhole position 212, right ahead of the manhole as represented by manhole position 213, to the left of the manhole as represented by manhole position 214, or to the right of the manhole as represented by manhole position 215. These are just examples of relative positions between the self-driving vehicle and the manhole.

The appropriate relative position depends on how the manhole cover handling mechanism is attached to the self-driving vehicle, and what part of the self-driving vehicle the mechanism is attached to. The important point is that once the self-driving vehicle is positioned with respect to the manhole, the manhole cover handling mechanism can operate to remove the manhole cover.

The self-driving vehicle 201 is illustrated as including a navigation mechanism 210. The navigation mechanism 210 may be a computing system that senses where in a system of roads the self-driving vehicle is currently, and how the self-driving vehicle is positioned within appropriate lanes of the road. Computer vision may aid the navigation mechanism in formulating a location model of the self-driving vehicle, and in generating appropriate instructions for the self-driving vehicle to change speed, maintain speed, and/or steer. Navigation mechanisms are known in the art, and the principles described herein are not limited to any particular navigation mechanism. As an example, the navigation mechanism 210 may be a computing system, such as the computing system 900 described below with respect to FIG. 9.

Returning to FIG. 1, while the self-driving vehicle is in the position with respect to the manhole, the self-driving vehicle performs an act of automatically removing the manhole cover of the manhole using a mechanism attached to the self-driving vehicle (act 102). An embodiment of such a mechanism will now be described with respect to FIG. 3.

Figure 3:
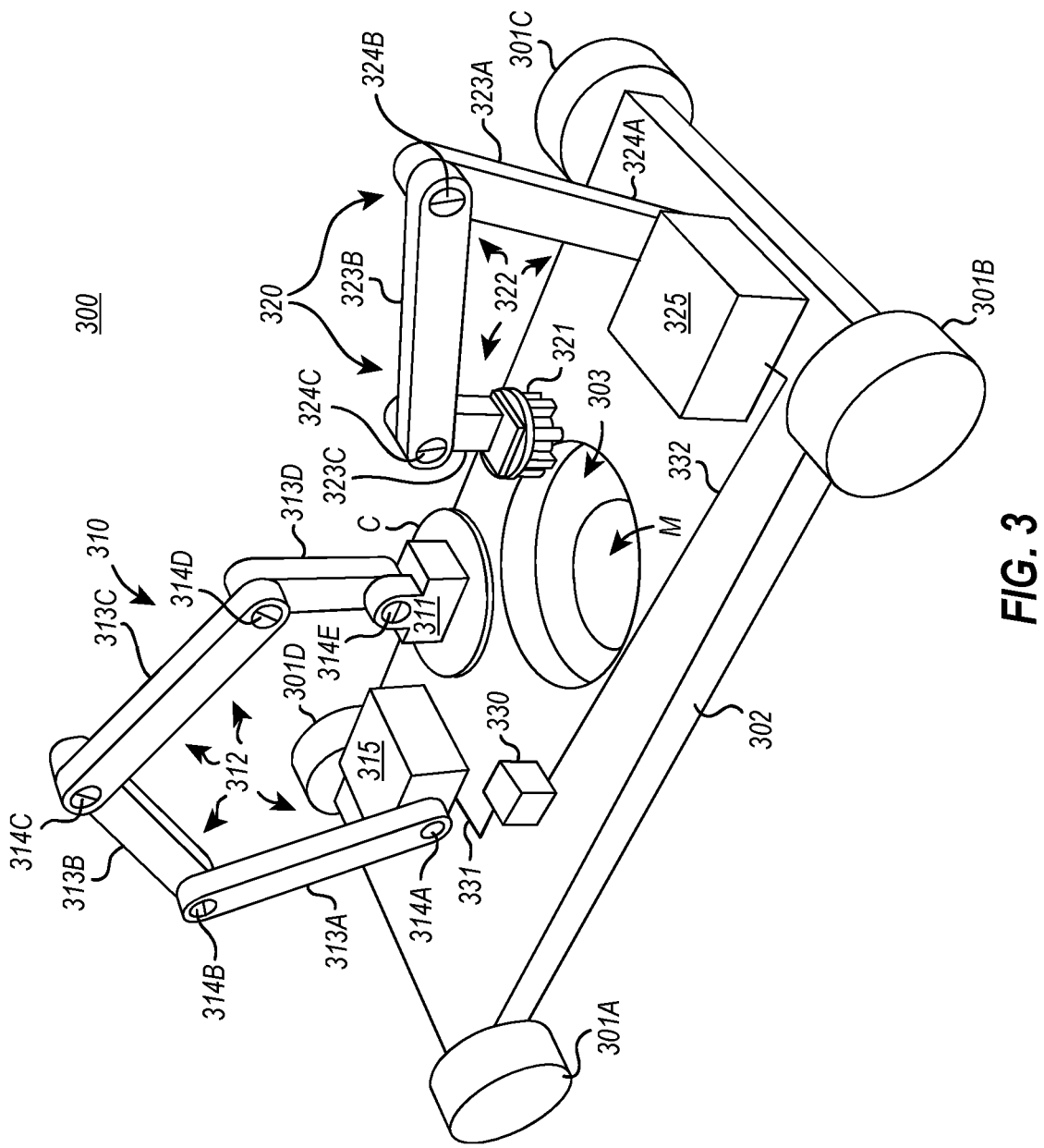
FIG. 3 is a simplified perspective diagram of a self-driving vehicle having an attached manhole cover handling mechanism and an attached tool handling mechanism, in accordance with a first embodiment of the self-driving vehicle.

FIG. 3 is a simplified perspective diagram of a self-driving vehicle 300 having an attached manhole cover handling mechanism 310 and an attached tool handling mechanism 320. The self-driving vehicle 300 is shown in simplified form as including four wheels 301A through 301D supporting an undercarriage 302. A command module 330 is also illustrated as attached within the self-driving vehicle 300 and is used to issue commands to the manhole cover handling mechanism 310 (via connection 331) and to the tool handling mechanism 320 (via connection 332). To maintain focus, other aspects of the self-driving vehicle 300 are not shown.

As an example, the manhole covering handling mechanism 310 and the tool handling mechanism 320 may be in the interior of the vehicle, and thus be protected from weather. Accordingly, in FIG. 3, the manhole cover handling mechanism 310 and the tool handling mechanism 320 are each attached to the self-driving vehicle 300 in the interior of the self-driving vehicle 300. The control module 330 is also within the interior of the self-driving vehicle 300. As an example, the control module 330 may be a computing system, such as the computing system 900 described below with respect to FIG. 9.

The undercarriage 302 has an access hole 303 formed therein. The manhole cover handling mechanism 310 accesses the manhole through the undercarriage hole 303, removes the manhole cover, and pulls the manhole cover into the interior of the self-driving vehicle 300. In FIG. 3, for example, the manhole cover handling mechanism 310 has pulled the manhole cover C off of the manhole M and lifted the manhole cover C into the self-driving vehicle 300. Accordingly, FIG. 3 is an example in which the self-driving vehicle would move to so that the manhole is at position 211 in FIG. 2, just underneath the self-driving vehicle.

The manhole cover handling mechanism 310 includes a manhole cover attachment mechanism 311 configured to attach to a manhole cover, and movement mechanism 312 configured to respond to commands to move the manhole cover attachment mechanism 311 with respect to the self-driving vehicle. As an example, the manhole cover attachment mechanism 311 could be a magnet so that mere bringing of the manhole cover attachment mechanism 311 into contact with the manhole cover C causes attachment. Alternatively, or in addition, the attachment mechanism 311 has a claw that grasps onto one or more holes of the manhole cover C. Alternatively, or in addition, the attachment mechanism could extend through a hole of the manhole cover C and then expand so that the expansion lifts up the manhole cover C from below.

In case of FIG. 3, the movement mechanism 312 is a linked lever system. Here, there are four links 313A, 313B, 313C and 313D. However, a linked lever system having fewer or greater links may also be employed. The link 313D is attached to the attachment mechanism 311 using a rotation joint 314E at one end, and to one end of link 313C via rotation joint 314D. The link 313C is attached to the link 313D via rotation joint 314D, and at the other end to the end of link 313B via rotation joint 314C. The link 313B is attached to the link 313C via rotation joint 314C, and at the other end to the end of link 313A via rotation joint 314B. The link 313A is attached to the link 313B via rotation joint 314B, and at the other end to the component 315 via rotation joint 314A. The component 315 may itself be rotatably (about a vertical axis and along a horizontal plane) attached to the self-driving vehicle.

Each of the joints and rotational attachments can be powered by a precision motor so as to enable fine-grained movement of the manhole cover attachment mechanism 311 (and any attached manhole cover C). Alternatively, one or more of the joints may be unpowered. As an example, joint 314D might be unpowered and allow free rotation as dictated by gravity. Additionally joint 314E might be unpowered as well. This would allow the final link 313D to be primarily vertically oriented as directed by gravity.

The command module 330 is configured to issue commands (via the connection 331) to the movement mechanism 312 to cause the movement mechanism 312 to force the manhole cover attachment mechanism 311 to attach to a manhole cover C of the manhole M that the self-driving vehicle has driven over, to lift the manhole cover C from off the manhole M, and to move the manhole cover C laterally out from directly above the manhole M. The command module 330 is also configured to put back the manhole cover C on the manhole M by for example reversing all of the movements used to remove the manhole cover C.

Returning to FIG. 1, while the manhole cover is removed, the self-driving vehicle may perform an act of positioning a tool above or within the manhole using a tool placement mechanism attached to the self-driving vehicle (act 111). An embodiment of such a mechanism is the tool handling mechanism 320 of FIG. 3, which is a linked lever system 122 that maneuvers a tool 321. Here, the linked lever system is illustrated as including three links 323A, 323B and 323C joined via rotation joints 324A, 324B and 324C. The component 325 may be fixed to the self-driving vehicle 300, or may be rotatably attached to the self-driving vehicle 300. The command module 330 is configured to issue commands to the tool placement mechanism 320 to cause the linked lever system 322 to place the tool 321 at or above the manhole M. This may be accomplished by causing component 325 to rotate and/or by causing the rotation joints 324A, 324B and/or 324C to rotate to force movement of the links 323A, 323B and 323C.

Returning to FIG. 1, the self-driving vehicle then performs an act of using the tool (act 112). As an example, the command module 330 may issue a command to cause the tool 321 to operate. For instance, the command module 330 may cause the tool 321 to image the manhole M and/or its contents, and also may save the imaging data locally and/or upload the imaging data to centralized storage (such as cloud storage). Alternatively, or in addition, the command module 330 may cause the tool to apply physical pressure to the manhole M and/or its contents.

The self-driving vehicle then performs an act of removing the tool from above or from within the manhole using the tool placement mechanism (act 113). The control module 330 is configured to do this by issuing appropriate commands to linked lever system 221 substantially reversing the process performed as part of act 111.

The self-driving vehicle then performs the act of automatically putting back the manhole cover on the manhole using a mechanism attached to the self-driving vehicle (act 103). The control module 330 is configured to issue commands to the movement mechanism 312 of the manhole cover handling mechanism 220 so as to put the manhole cover C back in place on the manhole M. This may be accomplished by reversing the commands that were used to remove the manhole cover C in the first place in act 101.

In some embodiments, the control module 330 can detect when full reversal was not accomplished, in which case the manhole cover C is not seated properly on the manhole M. The control module 330 may reattempt by re-lifting the manhole cover C, moving the manhole cover laterally in one or more directions, and then lowering the manhole cover C, until the manhole cover C is situated in place. Computer vision may be employed to aid the control module 330 in issuing appropriate commands to re-align the manhole cover C over the manhole M for proper seating.

FIGS. 4 through 7 illustrate alternative configurations of self-driving vehicles 400, 500, 600 and 700, respectively. Specifically, FIGS. 4 through 7 illustrated alternative configurations of manhole cover handling mechanisms and tool handling mechanisms.

Figure 4:
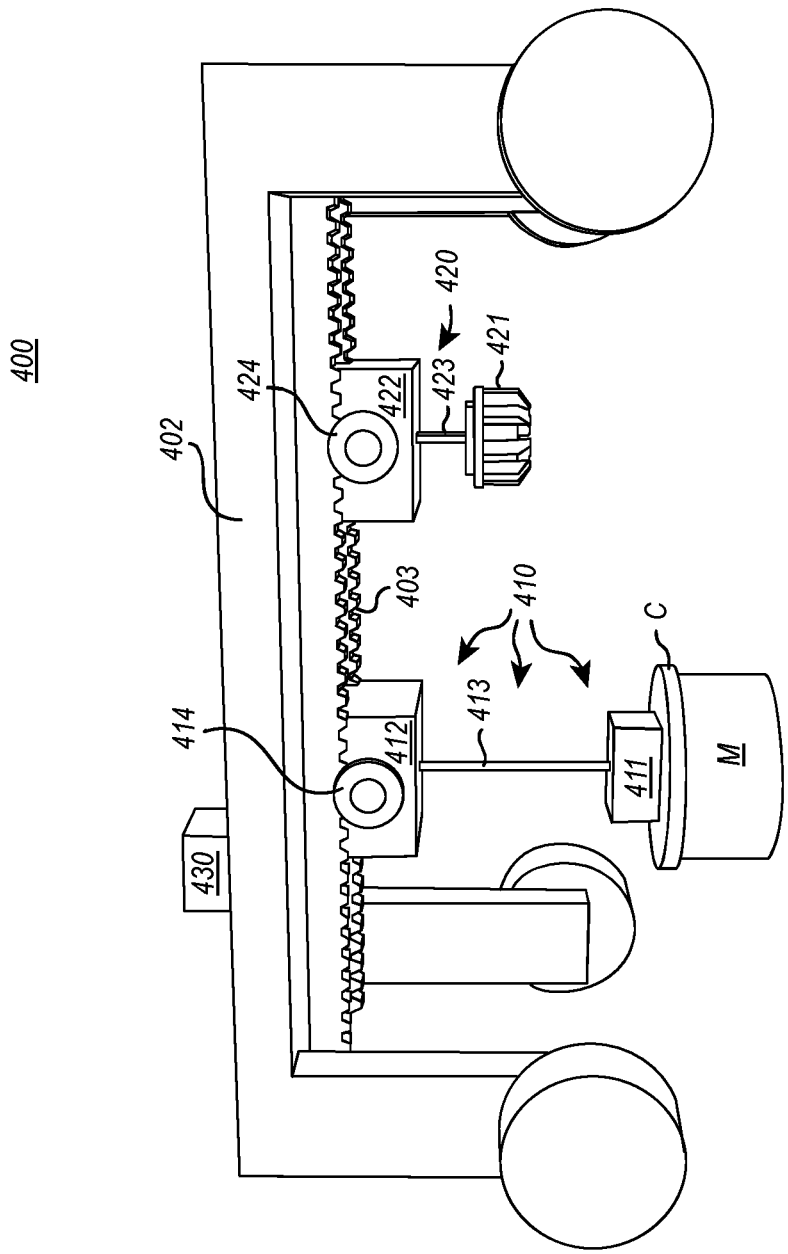
FIG. 4 is a simplified perspective diagram of a self-driving vehicle having an attached manhole cover handling mechanism and an attached tool handling mechanism, in accordance with a second embodiment of the self-driving vehicle.

FIG. 4 illustrates a self-driving vehicle 400 with an elevated undercarriage 402. Here, there is linear gear set 403 attached to the underside of the undercarriage 402. The manhole cover handling mechanism 410 includes a corresponding circular gear set 414 that interfaces with the linear gear set 403, so that when the circular gear set 414 rotates, the component 412 is caused to move horizontally. The component 412 may also have a linear extender 413 that has a manhole cover attachment mechanism 411 attached to the bottom.

The control module 430 is configured to issue commands to cause horizontal movement of the component 412 (and manhole cover attachment mechanism 411) by controlling rotation of the circular gear set 414. Furthermore, the control module 430 is configured to issue commands to cause vertical movement of the manhole cover attachment mechanism 411 by causing the linear extender 413 to extend and retract. In the configuration illustrated in FIG. 4, the control module 430 has moved the manhole cover attachment mechanism 411 so as to attach to the manhole cover C. The manhole cover attachment mechanism 411 may be structured as described above for the manhole cover attachment mechanism 311 of FIG. 3.

The tool placement mechanism 420 is similarly structured. That is, the tool handling mechanism 420 includes a corresponding circular gear set 424 that interfaces with the linear gear set 403, so that when the circular gear set 424 rotates, the component 422 is caused to move horizontally. The component 422 has a linear extender 423 that has a tool 421 attached to the bottom. The control module 430 is configured to issue commands to cause horizontal movement of the tool 421 by controlling rotation of the circular gear set 424. Furthermore, the control module 430 is configured to issue commands to cause vertical movement of the tool 421 by causing the linear extender 413 to extend and retract. The tool 421 may be structured as described above for the tool 321 of FIG. 3. The control module 430 may be structured as described above for the control module 330 of FIG. 3.

Figure 5:
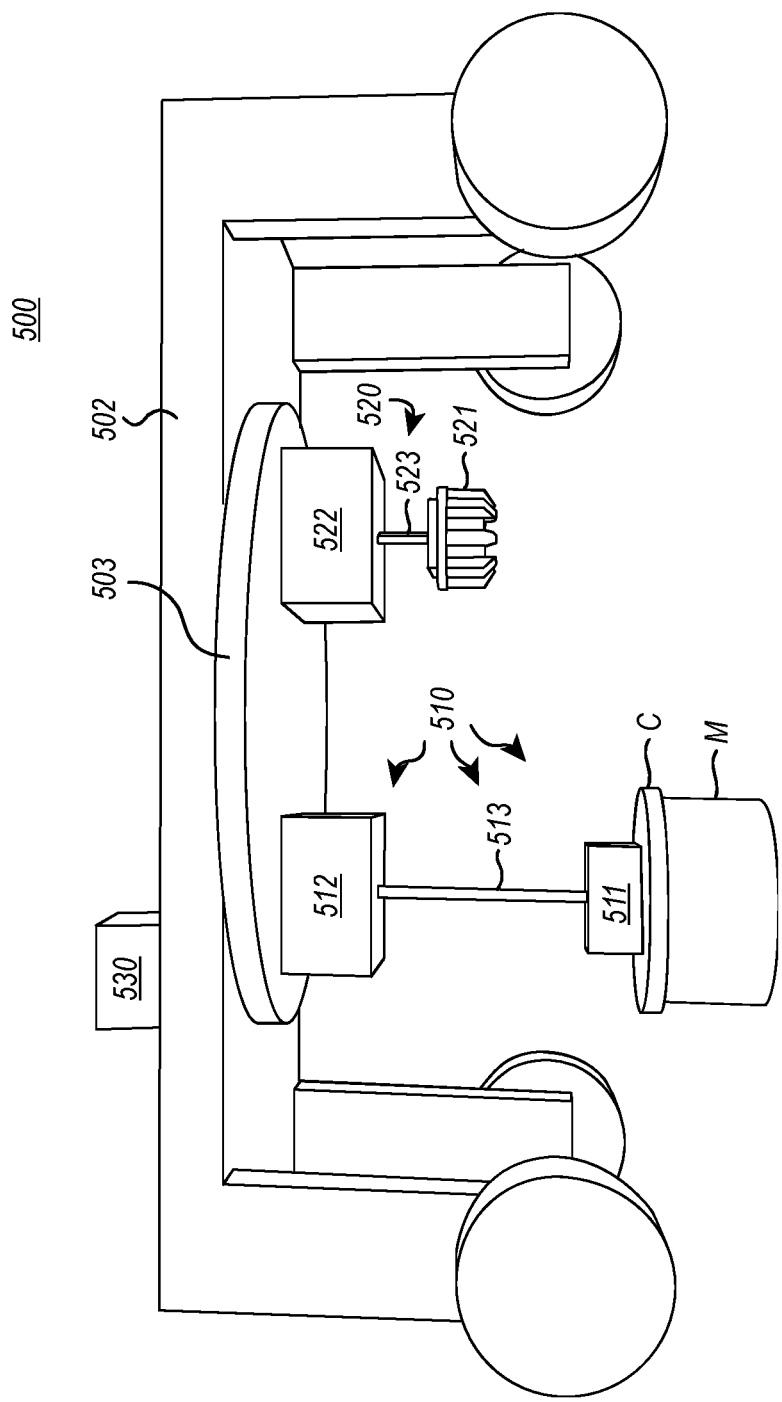
FIG. 5 is a simplified perspective diagram of a self-driving vehicle having an attached manhole cover handling mechanism and an attached tool handling mechanism, in accordance with a third embodiment of the self-driving vehicle.

FIG. 5 illustrates a self-driving vehicle 500 with an elevated undercarriage 502. Here, there is a wheel 503 that rotates horizontally about a vertical axis below the self-driving vehicle, and that is attached to the underside of the undercarriage 502. The manhole cover handling mechanism 510 includes a component 512 attached to the wheel 503, so that if the wheel 503 rotates, the manhole cover attachment mechanism 510 moves horizontally in a circle. The component 512 also has a linear extender 513 that has the manhole cover attachment mechanism 511 attached to the bottom. The manhole cover attachment mechanism 511 may be structured as described above for the manhole cover attachment mechanism 311 of FIG. 3.

The control module 530 is configured to issue commands to cause horizontal movement of the component 512 (and manhole cover attachment mechanism 511) by controlling rotation of the wheel 503. Furthermore, the control module 530 is configured to issue commands to cause vertical movement of the manhole cover attachment mechanism 511 by causing the linear extender 513 to extend and retract. In the configuration illustrated in FIG. 5, the control module 530 has moved the manhole cover attachment mechanism 511 so as to attach to the manhole cover C.

The tool handling mechanism 520 shares the wheel 503 with the manhole cover handling mechanism 510. That is, the component 522 of the tool handling mechanism 520 is also attached to the wheel 503 such that rotation of the wheel 503 also causes the component 522 (and tool 521) to move horizontally in a circle. The component 522 also has a linear extender 523 that has the tool 521 attached to the bottom. The tool 521 may be structured as described above for the tool 321 of FIG. 3.

The control module 530 is configured to cause horizontal movement of the tool 521 by controlling rotation of the wheel 503, and to cause vertical movement of the tool 521 by causing the linear extender 523 to extend and retract. The control module 530 may be structured as described above for the control module 330 of FIG. 3.

In operation, after the self-driving vehicle 500 has positioned itself over the manhole M in the position illustrated in FIG. 5, the self-driving vehicle maneuvers the manhole cover handling mechanism to attach to, lift, and move to the side the manhole cover. The self-driving vehicle then causes the tool placement mechanism to move the tool above or within the manhole M, uses the tool, and then moves the tool back out from over the manhole M. The self-driving vehicle then uses the manhole handling mechanism to put the manhole cover back in place, and detaches from the manhole cover.

Figure 6:
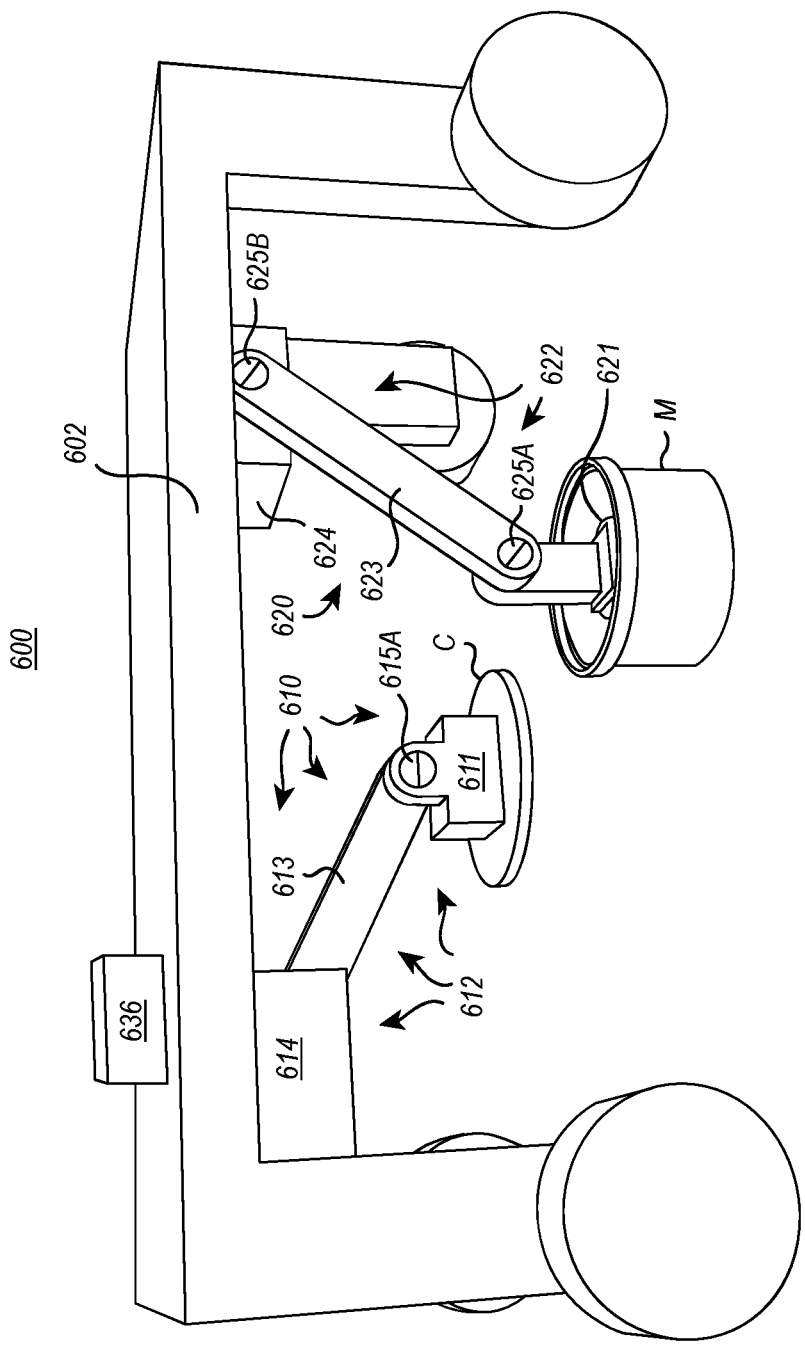
FIG. 6 is a simplified perspective diagram of a self-driving vehicle having an attached manhole cover handling mechanism and an attached tool handling mechanism, in accordance with a fourth embodiment of the self-driving vehicle.

FIG. 6 illustrates a self-driving vehicle 600 having an elevated undercarriage 602 and under which a handle cover handling mechanism 610 and a tool handling mechanism 620 are each attached to the undercarriage 602 of the self-driving vehicle 600.

Here, the handle cover handling mechanism 610 includes a manhole cover attachment mechanism 611 and a linked lever system 612. The manhole cover attachment mechanism 611 may be structured as described above for the manhole cover attachment mechanism 311 of FIG. 3. The linked lever system 612 includes a single link 613 rotatably attached to component 614 via a rotation joint (not shown) at one end, and at the other end to the manhole cover attachment mechanism 611 via the rotation joint 615A. The component 614 is rotatably mounted to the undercarriage 602 so as to be capable of rotation about a vertical axis (i.e., within a horizontal plane). Accordingly, the control module 630 is configured to control the positioning of the manhole cover attachment mechanism 611. In the illustrated case of FIG. 6, the manhole cover attachment mechanism 611 has removed the manhole cover C from the manhole M and moved the manhole cover C to the side to make way for the tool to be placed within the manhole M.

Here, the tool handling mechanism 620 includes a tool 621 and a linked lever system 622. The tool 621 may be structured as described above for the tool 321 of FIG. 3. The linked lever system 622 includes a single link 623 rotatably attached to component 624 via a rotation joint 625B at one end, and at the other end to the tool 621 via the rotation joint 625A. The component 624 is rotatably mounted to the undercarriage 602 so as to be capable of rotation about a vertical axis (i.e., within a horizontal plane).

Accordingly, the control module 630 is configured to control the positioning of the tool 621. In the illustrated case of FIG. 6, the tool 621 has been placed within the manhole M. The tool 621 may be structured as described above for the tool 321 of FIG. 3. The control module 630 may be structured as described above for the control module 330 of FIG. 3.

Figure 7:
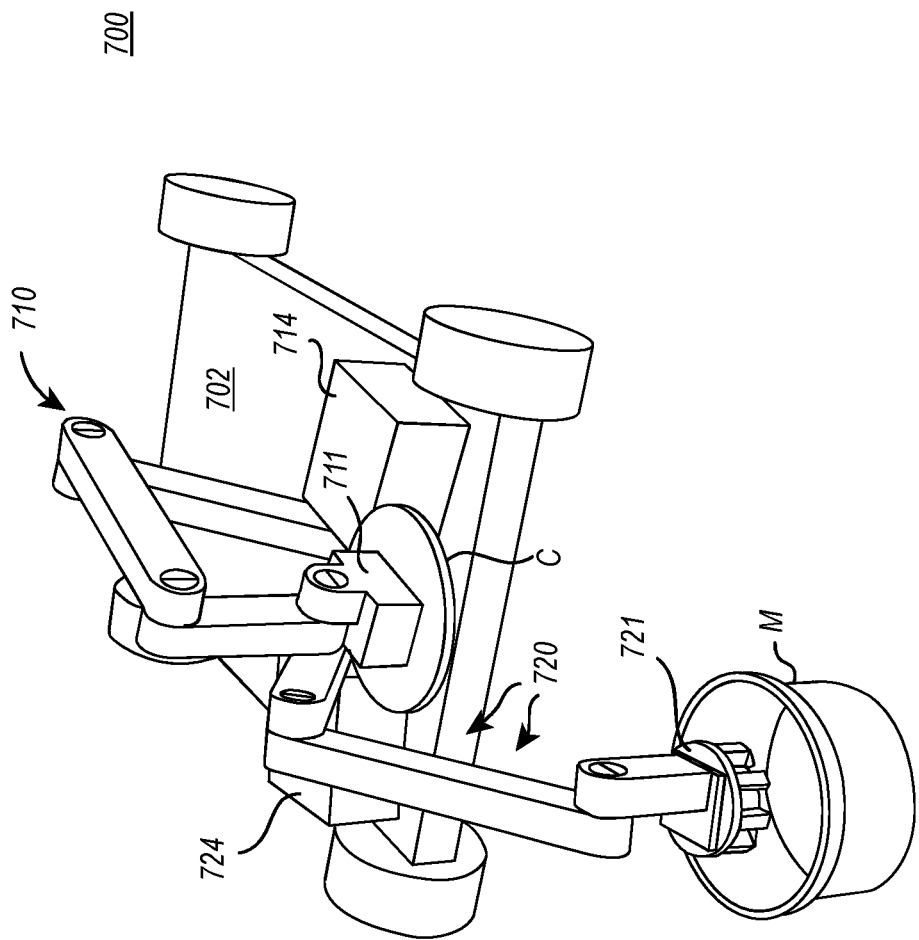
FIG. 7 is a simplified perspective diagram of a self-driving vehicle having an attached manhole cover handling mechanism and an attached tool handling mechanism, in accordance with a fifth embodiment of the self-driving vehicle.

FIG. 7 illustrates a self-driving vehicle 700 having a platform 702 on which a manhole cover handling mechanism 710 and a tool handling mechanism 720 are each attached. Again, in this case, each of these mechanisms is a linked lever system that is rotatably attached to the platform. That is, manhole cover handling mechanism 710 is attached at one end to a component 714 which is rotatably attached to the platform 702, and at the other end to the manhole cover attachment mechanism 711. Tool handling mechanism 720 is likewise attached at one end to a component 724 which is rotatably attached to the platform 702, and at the other end to the tool. As an example, manhole cover attachment mechanism 710 and tool handling mechanism 720 may be attached to the exterior of the self-driving vehicle at the front or back.

FIGS. 3 through 7 are just example configurations of a self-driving vehicle with example configurations of manhole cover handling mechanisms and tool handling mechanisms. The principles described herein are not limited to the precise structure of the self-driving vehicle nor the precise structure of the manhole cover handling mechanism or the tool handling mechanism. Any mechanism that is attached to the self-driving vehicle and that is automatically controllable by the self-driving vehicle to remove and replace the manhole cover will suffice.

Figure 8:
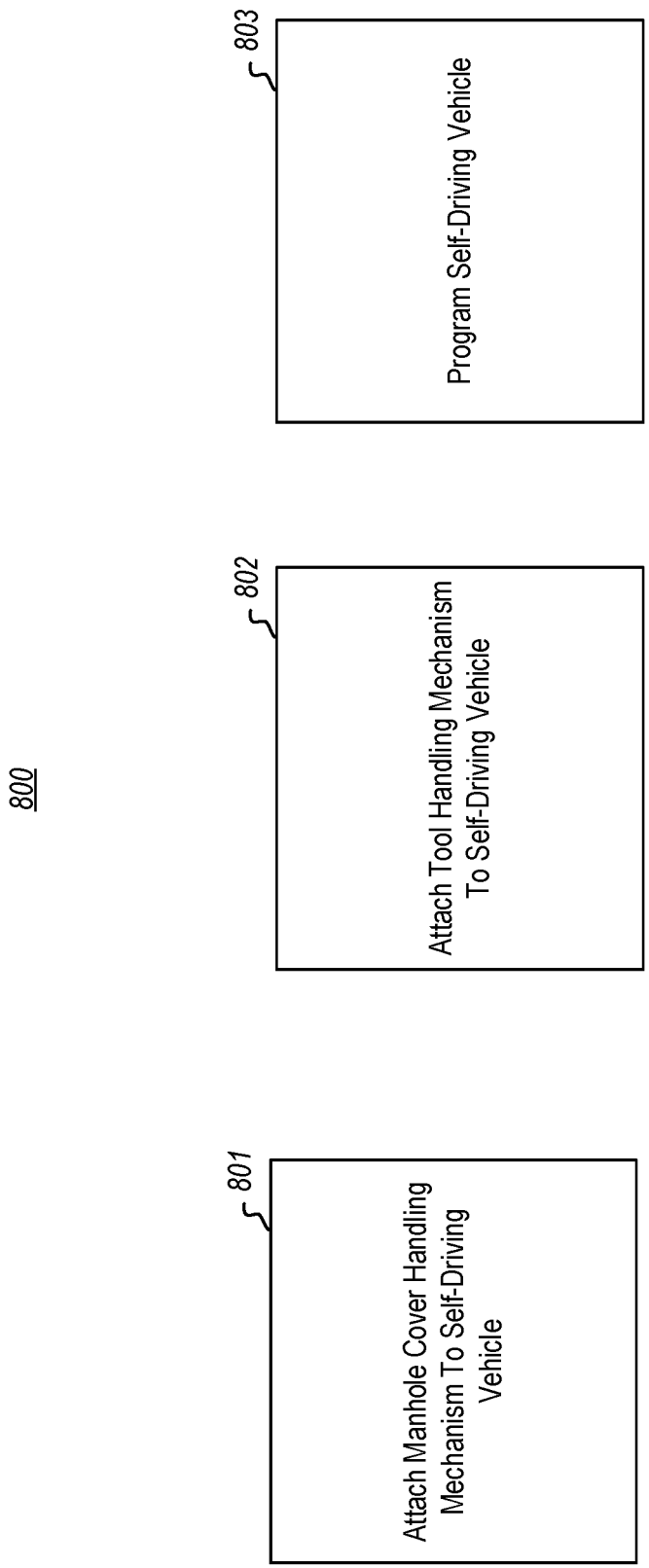
FIG. 8 illustrates a flowchart of a method for configuring a self-driving vehicle to automatically remove and put back manhole covers, in accordance with the principles described herein.

FIG. 8 illustrates a flowchart of a method 800 for configuring a self-driving vehicle to automatically remove and put back manhole covers, and optionally also to operate upon the manhole using a tool. The method 800 may begin with a self-driving vehicle that is already on the market, or may instead be a self-driving vehicle that is specially designed (e.g., with an elevated undercarriage in the case of FIGS. 5, 6 and 6) for use to accomplish the removal and replacement of the manhole covers.

The method 800 includes an act of attaching a manhole cover handling mechanism to the self-driving vehicle (act 801). That manhole cover handling mechanism is configured to operate as described herein to remove and put back a manhole cover. Optionally, the method 800 also includes an act of attaching a tool placement mechanism to the self-driving vehicle (act 802). The tool handling mechanism is configured to operate as described herein to place, operate, and retract the tool that operates upon the manhole.

The method 800 also includes an act of programming the self-driving vehicle to perform one or more of the acts of the method 100 of FIG. 1. As an example, the control modules may be programmed to perform one or more of 1) navigating the self-driving vehicle to manholes and stop at a position with respect to at least some of the manholes, 2) actuating the manhole cover handling mechanism when the self-driving vehicle has navigated to a position with respect to each of at least some of the manhole covers at which the self-driving vehicle stops, 3) actuating the tool placement mechanism for each of at least some manholes at which the manhole cover handling mechanism was actuated, and 4) putting back in place each of at least some of the manhole covers that were removed by the manhole cover mechanism.

The control modules described above may be a general purpose or special purpose computing system. Accordingly, because the principles described herein may be performed in the context of a computing system, some introductory discussion of a computing system will be described with respect to FIG. 9. Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 9:
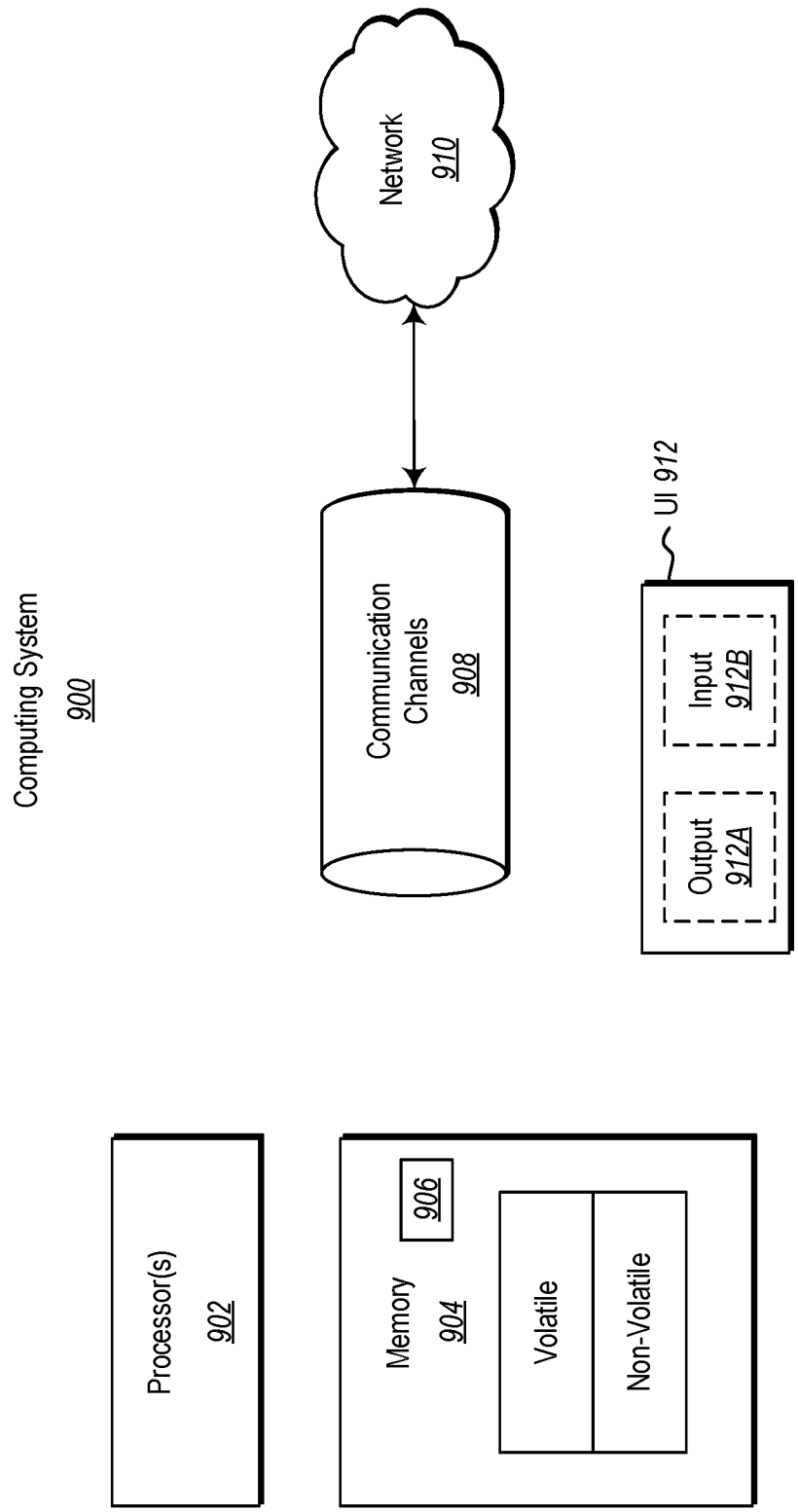
FIG. 9 illustrates an example computing system in which the principles described herein may be employed.

As illustrated in FIG. 9, in its most basic configuration, a computing system 900 includes at least one hardware processing unit 902 and memory 904. The processing unit 902 includes a general-purpose processor. Although not required, the processing unit 902 may also include a field programmable gate array (FPGA), an application specific integrated circuit (ASIC), or any other specialized circuit. In one embodiment, the memory 904 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 900 also has thereon multiple structures often referred to as an "executable component". For instance, the memory 904 of the computing system 900 is illustrated as including executable component 906. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 904 of the computing system 900. Computing system 900 may also contain communication channels 908 that allow the computing system 900 to communicate with other computing systems over, for example, network 910.

While not all computing systems require a user interface, in some embodiments, the computing system 900 includes a user interface system 912 for use in interfacing with a user. The user interface system 912 may include output mechanisms 912A as well as input mechanisms 912B. The principles described herein are not limited to the precise output mechanisms 912A or input mechanisms 912B as such will depend on the nature of the device. However, output mechanisms 912A might include, for instance, speakers, displays, tactile output, virtual or augmented reality, holograms and so forth. Examples of input mechanisms 912B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RANI within a network interface module (e.g., a "NTC"), and then be eventually transferred to computing system RANI and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A method performed by a self-driving vehicle for finding a manhole, exposing the manhole by removing a manhole cover of the manhole, temporarily placing a tool with respect to the exposed manhole, and then thereafter covering the exposed manhole cover back up, the method comprising:
   an act of self-driving over a road to the manhole on the road so as to position the self-driving vehicle in a position with respect to the manhole;
   while the self-driving vehicle is in the position with respect to the manhole, an act of automatically removing the manhole cover of the manhole using a mechanism attached to the self-driving vehicle, the manhole becoming thereby an exposed manhole due to removal of the manhole cover;
   while the manhole is exposed due to the removal of the manhole, an act of positioning a tool above or within the exposed manhole using a tool handling mechanism attached to the self-driving vehicle, and an act of removing the tool from above or from within the exposed manhole using the tool handling mechanism; and
   after the act of removing the tool from above or from within the exposed manhole, an act of automatically putting back the manhole cover on the exposed manhole using a mechanism attached to the self-driving vehicle.

2. The method in accordance with claim 1, the mechanism used to automatically remove the manhole cover from manhole being a manhole cover handling mechanism, the mechanism used to put back the manhole cover on the manhole also being the manhole cover handling mechanism.

3. A method in accordance with claim 1, further comprising:
   between the act of positioning the tool and the act of removing the tool, an act of using the tool to apply physical force to the exposed manhole or content of the exposed manhole.

4. A method in accordance with claim 1, further comprising:
   between the act of positioning the tool and the act of removing the tool, an act of using the tool to inspect the exposed manhole or content of the exposed manhole.

5. A self-driving vehicle that is configured to find manholes, expose the manhole by removing the manhole cover, operate on the exposed manhole, thereafter cover the exposed manhole back up, the self-driving vehicle comprising:
   a manhole navigation mechanism configured to find a manhole on the road, and to position the self-driving vehicle at a position with respect to the manhole;
   a manhole cover handling mechanism attached to the self-driving vehicle, the manhole cover handling mechanism comprising:
   a manhole cover attachment mechanism configured to attach to a manhole cover; and
   a movement mechanism configured to respond to commands to move the manhole cover attachment mechanism with respect to the self-driving vehicle;
   a command module configured to issue commands to the movement mechanism to cause the movement mechanism to force the manhole cover attachment mechanism to attach to a manhole cover that the manhole navigation mechanism has caused the self-driving vehicle to drive close to, to lift the manhole cover from off the cover, to move the manhole cover laterally out from directly above the manhole to thereby expose the manhole, and to put back the manhole cover on the exposed manhole to thereby cover the manhole back up; and a tool handling mechanism mounted to the self-driving vehicle and configured to place a tool above or within the exposed manhole whilst the manhole handling mechanism has allowed access to the exposed manhole after lifting the manhole cover, and prior to putting the manhole cover back on the exposed manhole.

6. The self-driving vehicle of claim 5, the command module configured to
issue commands to the tool handling mechanism to cause the tool handling mechanism to place the tool and remove the tool.

7. The self-driving vehicle of claim 5, the movement mechanism comprising
a linked lever rotatably connected at one end to the self-driving vehicle, and at the other end to the manhole cover attachment mechanism.

8. The self-driving vehicle of claim 5, the manhole cover handling mechanism being attached to the exterior of the self-driving vehicle.

9. A self-driving vehicle that is configured to find and remove manhole covers, the self-driving vehicle comprising:
a manhole navigation mechanism configured to find a manhole on the road, and to position the self-driving vehicle at a position with respect to the manhole;
a manhole cover handling mechanism attached to the self-driving vehicle, the manhole cover handling mechanism comprising:
a manhole cover attachment mechanism configured to attach to a manhole cover; and
a movement mechanism configured to respond to commands to move the manhole cover attachment mechanism with respect to the self-driving vehicle, the movement mechanism comprising a wheel that rotates about a vertical axis below the self-driving vehicle and having a linear extender that extends and retracts vertically, the manhole cover attachment mechanism attached to one end of the linear extender; and
a command module configured to issue commands to the movement mechanism to cause the movement mechanism to force the manhole cover attachment mechanism to attach to a manhole cover that the manhole navigation mechanism has caused the self-driving vehicle to drive close to, to lift the manhole cover from off the cover, to move the manhole cover laterally out from directly above the manhole, and to put back the manhole cover on the manhole.

10. A self-driving vehicle that is configured to find and remove manhole covers, the self-driving vehicle comprising:
a manhole navigation mechanism configured to find a manhole on the road, and to position the self-driving vehicle at a position with respect to the manhole;
a manhole cover handling mechanism attached to the self-driving vehicle, the manhole cover handling mechanism comprising:
a manhole cover attachment mechanism configured to attach to a manhole cover; and
a movement mechanism configured to respond to commands to move the manhole cover attachment mechanism with respect to the self-driving vehicle, the movement mechanism comprising a gear system that allows movement horizontally, and a linear extender that extends and retracts vertically, the manhole cover attachment mechanism attached to one end of the linear extender; and
a command module configured to issue commands to the movement mechanism to cause the movement mechanism to force the manhole cover attachment mechanism to attach to a manhole cover that the manhole navigation mechanism has caused the self-driving vehicle to drive close to, to lift the manhole cover from off the cover, to move the manhole cover laterally out from directly above the manhole, and to put back the manhole cover on the manhole.

11. A self-driving vehicle that is configured to find and remove manhole covers, the self-driving vehicle comprising:
a manhole navigation mechanism configured to find a manhole on the road, and to position the self-driving vehicle at a position with respect to the manhole;
a manhole cover handling mechanism attached to the self-driving vehicle, the manhole cover handling mechanism comprising:
a manhole cover attachment mechanism configured to attach to a manhole cover; and
a movement mechanism configured to respond to commands to move the manhole cover attachment mechanism with respect to the self-driving vehicle;
a command module configured to issue commands to the movement mechanism to cause the movement mechanism to force the manhole cover attachment mechanism to attach to a manhole cover that the manhole navigation mechanism has caused the self-driving vehicle to drive close to, to lift the manhole cover from off the cover, to move the manhole cover laterally out from directly above the manhole, and to put back the manhole cover on the manhole, the manhole cover handling mechanism being attached to the self-driving vehicle inside the self-driving car, the self-driving vehicle having a hole in the floor thereof through which the manhole cover can be retrieved and put back by the manhole cover handling mechanism.

* * * * *